United States Patent [19]

Ball

[11] 4,171,664
[45] Oct. 23, 1979

[54] MINE SIMULATOR PLANTING RACK AND RELEASE MECHANISM

[75] Inventor: Herbert L. Ball, Ridgecrest, Calif.

[73] Assignee: The United States of America as represented by the Secretary of the Navy, Washington, D.C.

[21] Appl. No.: 877,545

[22] Filed: Feb. 13, 1978

[51] Int. Cl.² .............................................. F41F 5/00
[52] U.S. Cl. .............................. 89/1.5 H; 244/137 R
[58] Field of Search .............. 89/1.5 H, 1.5 R, 1.5 A, 89/1.5 C, 1.806, 1.816; 244/137 R

[56] References Cited

U.S. PATENT DOCUMENTS

| | | | |
|---|---|---|---|
| 1,172,542 | 2/1916 | McMullen | 89/1.5 H |
| 1,298,143 | 3/1919 | Wrightson et al. | 102/13 |
| 1,827,580 | 10/1931 | Hoehn et al. | 89/1.5 A |
| 2,309,686 | 2/1943 | Winters | 89/1.5 H |
| 2,330,815 | 10/1943 | Dunajeff | 89/1.5 R |
| 2,374,885 | 5/1945 | Nichols | 89/1.5 H |
| 2,379,383 | 6/1945 | Steel | 89/1.5 H |
| 2,387,124 | 10/1945 | Dennison | 114/239 |
| 2,451,476 | 10/1948 | Darnall | 89/1.5 H |
| 2,453,869 | 11/1948 | Slate | 89/1.5 R |
| 2,481,501 | 9/1949 | Darnall | 89/1.5 H |
| 2,741,159 | 4/1956 | Procos | 89/1.5 H |
| 2,744,486 | 5/1956 | Buck | 114/239 |
| 3,036,852 | 5/1962 | Mullison | 294/83 |
| 3,628,416 | 12/1971 | Kernan | 89/1.5 R |
| 3,808,941 | 5/1974 | Biggs | 89/1.5 R |

OTHER PUBLICATIONS

APC Application of Magni et al., published 5-4-1943.

*Primary Examiner*—David H. Brown
*Attorney, Agent, or Firm*—R. S. Sciascia; W. Thom Skeer; T. W. Hennen

[57] ABSTRACT

A storage and planting rack for an actuation mine simulator, having a rectangular frame enclosing an open central volume, guiding channels for orienting the mine simulator, and latching and tripping mechanisms for controlling release of the mine simulator. Fins on the mine simulator are guided by diagonally opposed channels into the storage and planting rack. An electro mechanical member causes release of the mine simulator in response to an electric signal, thereby enabling planting crews to precisely control the planting location of each mine simulator.

19 Claims, 5 Drawing Figures

MINE SIMULATOR PLANTING RACK AND RELEASE MECHANISM

BACKGROUND OF THE INVENTION

1. Field of the Invention

This invention pertains to devices for holding objects, and dropping those objects in a controlled manner at a predetermined time. More particularly, the present invention pertains to such devices which also serve to store the objects when the objects are not in use.

2. Description of the Prior Art

Prior to development of the actuation mine simulator for which the present invention was developed, mine simulators were bulky and less sophisticated, and planting them either required a crew to manhandle them off the side of a ship, or the mine simulators were planted by air drop from a fixed wing aircraft. The positions of planted simulators could not be controlled as precisely as is now possible using the present invention. Also, planting crews were often exposed to the usual dangers of injury which accompany manual lifting and dropping of heavy objects.

SUMMARY OF THE INVENTION

The development of a more compact and more sophisticated actuation mine simulator in conjunction with the present invention overcomes the inconveniences and dangers inherent in the prior art. The storage and planting rack of the present invention is a welded aluminum structure defining a rectangular volume. Guiding channels attached to the frame of the planting rack engage fins on the mine simulator and orient it relative to the planting rack. These guiding channels prevent tumbling of the mine simulator as it falls from the rack. This reduces the chance of damage to the mine simulator, and improves planting location precision. At the base of the guiding channel a pivoting end support member is supported by a pivoting sear. This sear is supported by a pivoting sear release arm which is spring loaded and retained in the locked position by a spring loaded triggering bar. This bar is maintained in the engaged position by a cable attached to a plunger in a linear actuator. The end support member may be pivoted to release the mine simulator by applying an electric signal to the linear actuator. Key releasing elements being spring loaded, release is positive and quick. A strongback, which is used to load the simulator into the planting rack, doubles as an attach point for lifting the combined simulator and planting rack by crane or helicopter. More than one storage and planting rack may be joined to form a battery of planting racks, all under the control of the single operator.

BRIEF DESCRIPTION OF THE DRAWINGS

Further advantages of the present invention will emerge from a description which follows of the preferred embodiment of a storage and planting rack and release mechanism according to the invention, given with reference to the accompanying drawing figures, in which.

DESCRIPTION OF THE PREFERRED EMBODIMENT

Figure 1:
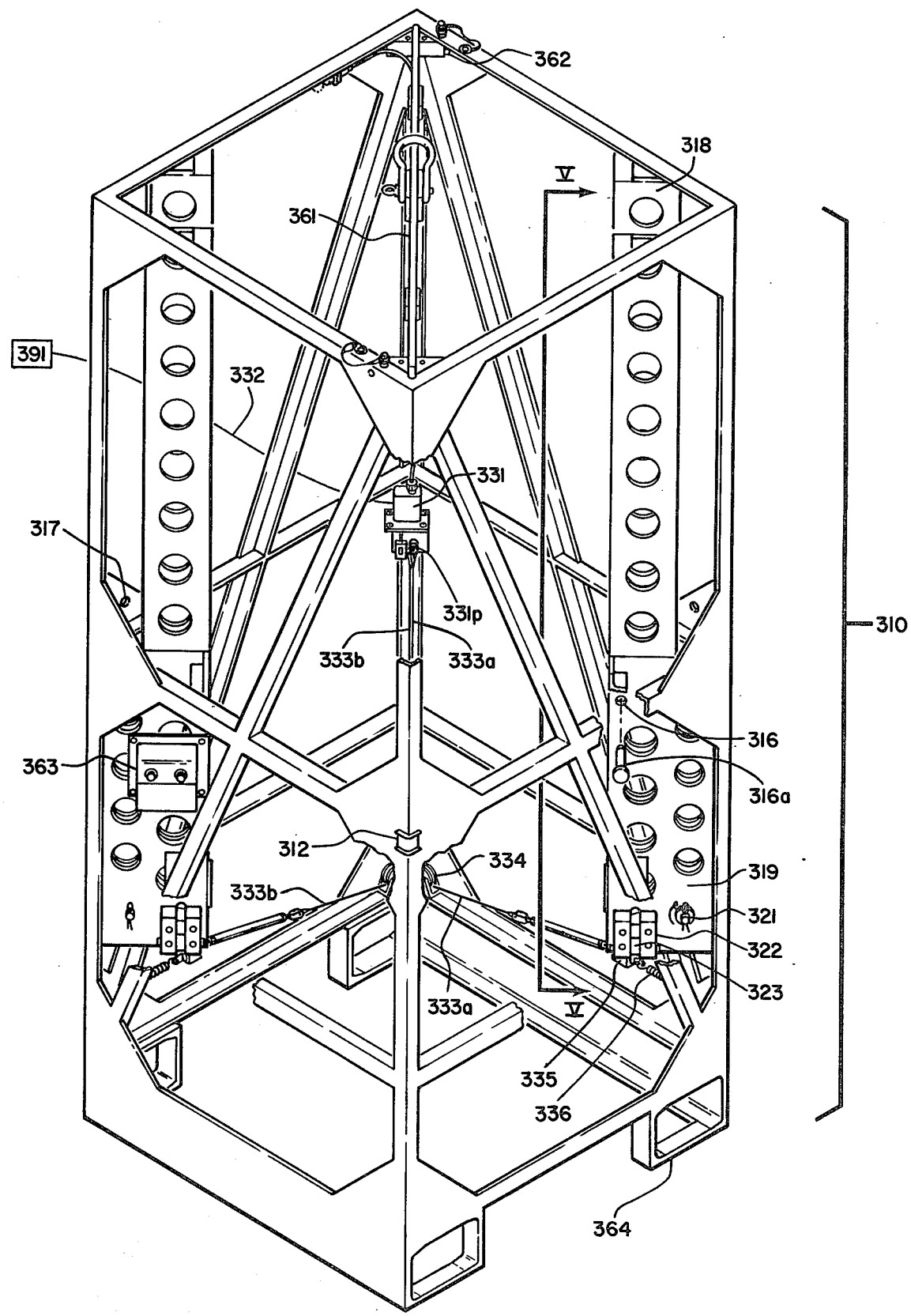
FIG. 1 illustrates a perspective view of a mine simulator planting rack and release mechanism according to the invention.
Figure 2:
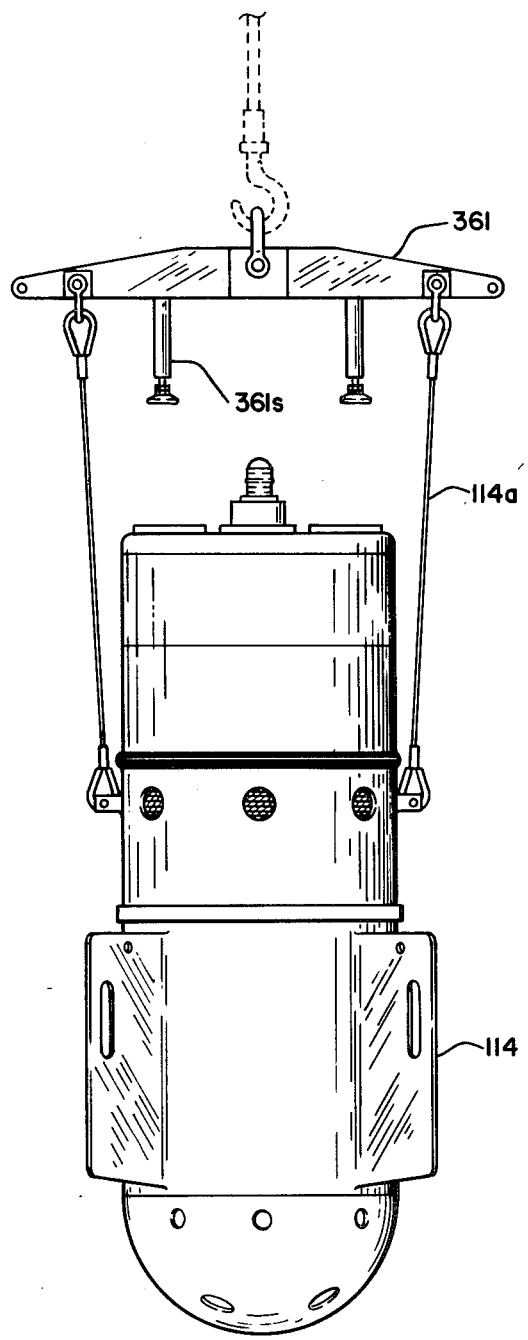
FIG. 2 illustrates a mine simulator suitable for deployment by the planting rack of the present invention.

Referring now to the drawing figures generally, and particularly to FIG. 1, there is shown storage and planting rack 310. Rack 310 has two sets of guiding channels 318 arranged in diagonally opposed corners. Channels 318 guide fins 114 on a mine simulator which is illustrated in FIG. 2. Rack 310 also includes strongback 361 which is attached by means of removable pins 362. Strongback 361 serves as a means for loading a mine simulator into rack 310 as well as a means for lifting a loaded or unloaded rack. Tines from a forklift type vehicle may be inserted in socket 364 to enable safe handling without the danger that rack 310 will slide off the tines or tip while being handled.

When a mine simulator is loaded within rack 310, safety pin 316a is inserted in hole 316 and passes through corresponding holes in fin 114 and in the other flange of channel 319. Pin 316a is retained in position during storage by a cotter pin or safety wire (not shown), or by any other suitable means. Pin 316a prevents inadvertent release of a mine simulator while simulator and rack 310 are in storage or transit. Pouch 363 is conveniently placed to retain miscellaneous small parts such as cotter pins or safety pins.

Rack 310 may be joined with one or more racks to form a battery of planting racks. When assembled in this manner, bolts, not shown, join adjacent racks through webs at hole 317, and a steel band, not shown, encircles the assembly and bears against corner pads 312 on the respective racks to stabilize the assembly for transport by crane or helicopter.

Figure 4:
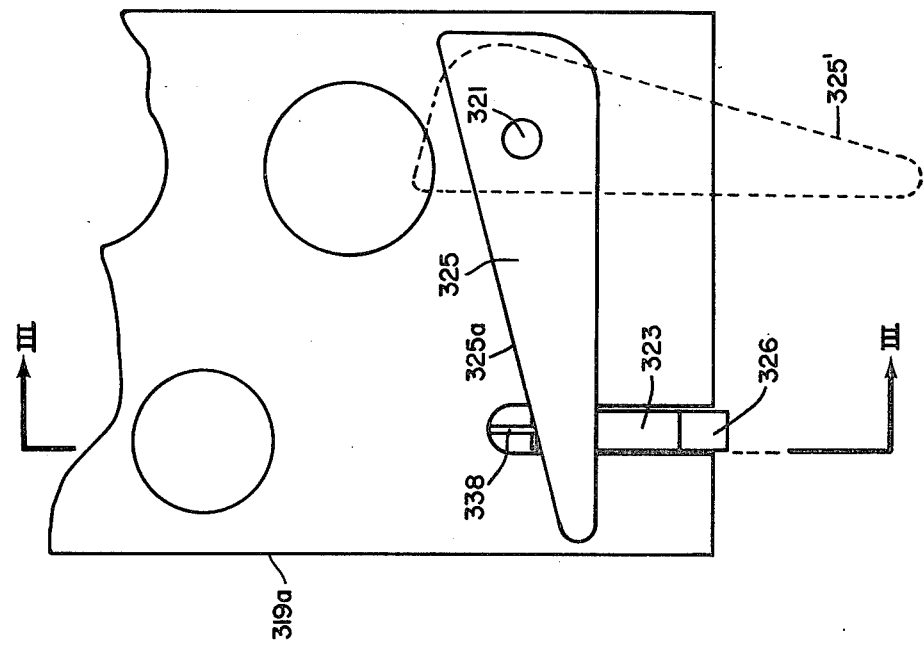
FIG. 4 illustrates the pivoting fin support portion of the release mechanism utilized in the present invention.
Figure 3:
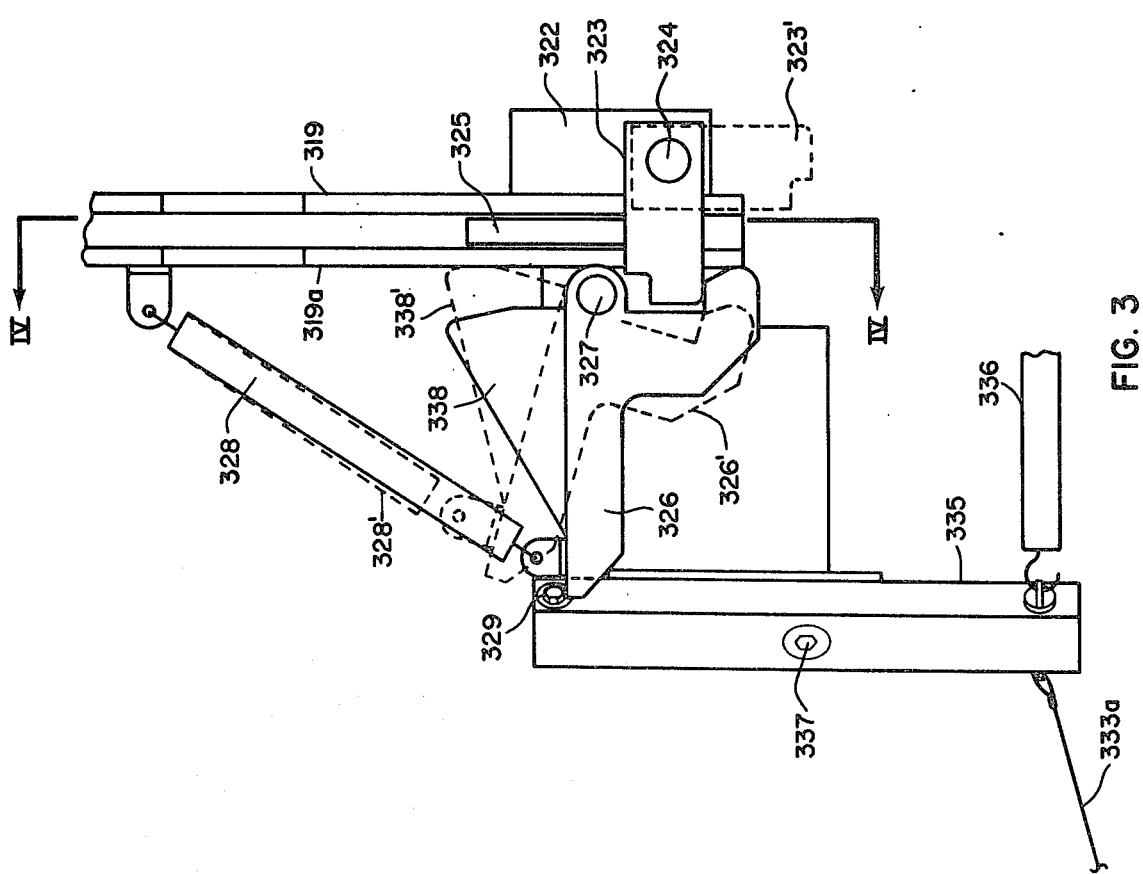
FIG. 3 illustrates the release mechanism utilized in the present invention.
Figure 5:
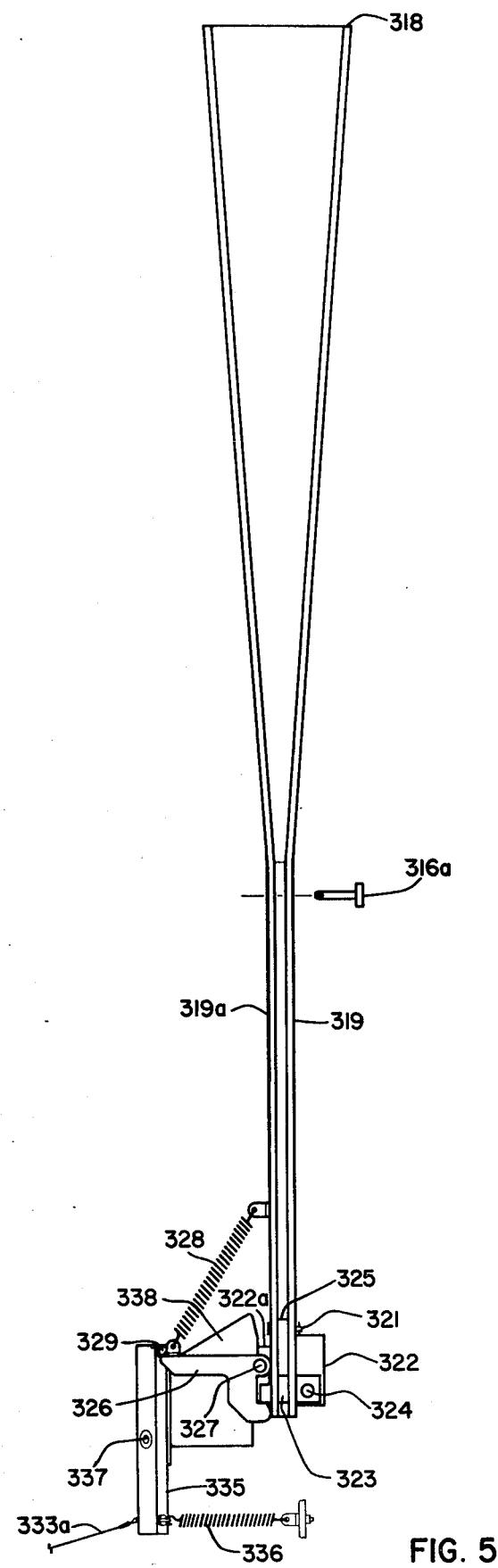
FIG. 5 illustrates the relationship between the guiding channel and release mechanism as utilized in the present invention.

Referring now to FIG. 5 there is shown the guiding channel 318 and the release mechanism. Duplicate mechanisms in diagonally opposed corners of rack 310 control the simulator. For clarity, only one mechanism will be described, but two simultaneously functioning mechanisms are preferred. Channel 318 has sides 319 and 319a. Fin 114 is maintained between side 319 and 319a, and rests against fin support member 325. Fin support member 325, shown to advantage in FIG. 4, pivots around shaft 321. Surface 325a is configured to match the corresponding configuration of front end of fin 114. Fin support member 325, when latched, is in the position shown in FIG. 4, but when unlatched, falls to the position shown by number 325' in FIG. 4. Fin support member 325, when latched, is supported by sear 323, which in turn pivots about shaft 324 in mounting block 322, which is attached to channel side 319.

Sear 323 is supported by sear release arm 326, which pivots about shaft 327 under the biasing influence of spring 328. Sear release arm 326 is prevented from rotating by stop 329 on triggering arm 335. Spring 336, attached between frame structure and triggering arm 335, loads triggering arm 335 with releasing energy which is resisted by cable 333a attached to triggering arm 335. Triggering arm 335 pivots about shaft 337. Cable 333a and corresponding cable 333b shown in FIG. 1 pass over pulleys 334 and are connected to a movable plunger 331p in electro-mechanical linear actuator 331. Electric wire 332 joins linear actuator 331 with remote control station 391.

Electric wire 332 extends between linear actuator 331 and a remote control station 391 where a single operator may simultaneously control release from one or more planting racks. During functioning of the release mechanism, sear release arm 326 is rotated about shaft 327 until sear 323 is released. Rotation of sear release arm 326 is caused by force from spring 328. Rotation of sear release arm 326 is limited by dorsal fin 338 which comes in contact with channel side 319a after a limited amount of rotation, sufficient to release sear 323, has been accomplished.

In operation, the planting and storage rack 310 may be handled by either forklift, in sockets 364, or by overhead crane or helicopter by means of strongback 361 or other suspending means. Rack 310 is loaded by detaching strongback 361 from the rack and attaching it to a mine simulator by means of support cables 114A. The simulator is then lifted to the top of rack 310 by overhead crane and lowered so that opposite fins 114 engage guiding channels 318, and thereby align the simulator with the rack. As the simulator is lowered, the leading edge of each engaged fin 114 contacts fin support surface 325a on each fin support member 325 which is locked in position by sear 323 and the accompaning mechanism. The support cables are then removed, and strongback 361 attached with adjustable steady rods 361 bearing on the simulator. If the loaded rack is to be transported, safety pins 316a are inserted, as previously described, to prevent inadvertent release of the simulator in transit.

When the simulator is ready for deployment, either from the side of a ship or from a helicopter, safety pins 316a are removed, and strongback 361 is attached to rack 310 with pins 362 and either to a crane cable or to a lifting cable from a helicopter. Release of the simulator is under the control of an operator at station 391.

When the precise point for planting a simulator has been reached, the operator manipulates a remote control to send a signal to actuator 331 by way of electric wire 332. Actuator plunger 331p immediately functions, reducing the tension in cables 333a and 333b. Movement of cables 333a and 333b permits springs 336 to pivot triggering arms 335 about shafts 337 causing stops 329 to release sear release arms 326. Arms 326 immediately move to position 326' and dorsal fins 338 move to the positon shown as 338'. Spring 328 contracts to the position shown by 328'. Sear 323 is thereby released and falls to position 323'. This, in turn, releases fin support member 325, which falls to position 325', and the mine simulator falls through the bottom opening of rack 310 and into the sea. Simulator attitude, after leaving rack 310, is stabilized by the lower channel 319 and 319a, so that it does not tumble during its free fall to the sea. Rack 310 is then returned to the ship deck to await the recovery of the mine simulator.

After recovery, each mine simulator is reloaded into its respective rack 310, and returned to a mine shop for maintenance. Since the majority of rack 310 is constructed of aluminum, a fresh water rinse after use near sea water is considered good practice. Safety pins 316a which were removed prior to the deployment of the mine simulator, are again replaced in holes 316 to prevent inadvertent release of the simulator in transit. While the pins are not in place they may be stored with other small parts in pouch 363.

Of course, the linear actuator, cable, and pulley system shown in FIG. 1 is only one possible arrangement and any system such as one using gears, levers or hydraulics, whereby triggering arms 335 are maintained in position against the pull of springs 336 until release is desired, could be used. Shaft 327, which serves as a pivot for sear release arm 326, is attached to mounting block 322a which, in turn, is attached to channel side 319a.

The present invention is used in the Actuation Mine Simulator System, and other inventions related thereto, filed of even date with the present invention, include the Planting and Storage Rack and Release Mechanism, Navy Case No. 60893, the Flare Release System, Navy Case No. 60833, the Underwater Search Coil, Navy Case No. 61366, the Actuation Mine Simulator, Navy Case No. 60654. Also, U.S. Pat. No. 3,960,087 to Beatty et al. may be used within the Actuation Mine Simulator System.

Although the preferred embodiment has been described, it will be understood that within the purview of this invention, various changes may be made in the form, details, proportion and arrangement of parts, the combination thereof, and mode of operation, which generally stated results in a device capable of carrying out the features set forth, as disclosed and defined in the appended claims.

What is claimed is:

1. A storage and planting rack, comprising:
   a frame of rectangular, open construction enclosing an open end and a central volume and configured to contain an object having fins;
   channeling means attached to diagonal corners of said frame for operating upon said fins to maintain said object in a predetermined orientation relative to said frame;
   latching means attached to said channeling means for retaining said fins and, thus, said object within said open central volume; and
   tripping means attached to said frame and operatively connected to said latching means for releasing said latching means in response to a signal, whereby said object may slide from said open central volume.

2. A storage and planting rack as set forth in claim 1 further including suspending means attached to said frame for lifting said storage and planting rack.

3. A storage and planting rack as set forth in claim 1 wherein said frame comprises a welded aluminum structure.

4. A storage and planting rack as set forth in claim 1 wherein said frame is configured to facilitate handling by fork tines.

5. A storage and planting rack as set forth in claim 1 wherein said latching means, and said tripping means each comprise pluralities of similar mechanisms arranged in said frame in diagonal opposition.

6. A storage and planting rack as set forth in claim 1 wherein said rack includes means for joining at least one additional storage and planting rack to form a battery of storage and planting racks.

7. A storage and planting rack as set forth in claim 6 where said means for joining includes apertured webs attached to the aforesaid frame.

8. A storage and planting rack as set forth in claim 6 where said means for joining includes corner pads attached to the aforesaid frame.

9. A storage and planting rack as set forth in claim 6 where said means for joining includes;
    apertured webs attached to the aforesaid frame configured to receive bolts therethrough; and
    corner pads attached to the aforesaid frame configured to provide bearing surfaces for encircling bands.

10. A storage and planting rack comprising:
    a frame enclosing an open central volume and configured to contain an object having fins;
    channeling means attached to said frame for operating upon said fins to maintain said object in a predetermined orientation relative to said frame;
    a fin support member attached to said channeling means and pivotable between supporting and dropping positions, said fin support member being operative in said supporting position to support one of said fins on said object;
    a sear attached to said channeling means and pivotable between blocking and freeing positions, said sear being operative in said blocking position to hold said fin support member in said supporting position;
    a sear release arm attached to said channeling means and pivotable between latched and unlatched positions, said sear release arm being resiliently biased toward said unlatched position and operative in said latched position to maintain said sear in said blocking position;
    a triggering bar attached to said frame and pivotable between engaging and releasing positions, said triggering bar being resiliently biased toward said releasing position to maintain said sear release arm in said latched position;
    a linear actuator attached to said frame and having a plunger which is responsive in linear motion to an electric signal;
    a cable attached on one end to said plunger and attached on the other end to said triggering bar; and
    tripping means attached to said frame for releasing said cable in response to a signal.

11. A storage and planting rack as set forth in claim 10 further including suspending means attached to said frame for lifting said storage and planting rack.

12. A storage and planting rack as set forth in claim 10 wherein said frame has at least one open end communicating with said open central volume for passing said object.

13. A storage and planting rack as set forth in claim 10 wherein said frame comprises aluminum.

14. A storage and planting rack as set forth in claim 10 wherein said frame is configured to facilitate handling by fork tines.

15. A storage and planting rack as set forth in claim 10 wherein said tripping means comprises a plurality of similar mechanisms arranged in said frame in diagonal opposition.

16. A storage and planting rack as set forth in claim 10 wherein said rack includes means for joining at least one additional storage and planting rack to form a battery of storage and planting racks.

17. A storage and planting rack as set forth in claim 16 where said means for joining includes apertured webs attached to the aforesaid frame.

18. A storage and planting rack as set forth in claim 16 where said means for joining includes corner pads attached to the aforesaid frame.

19. A storage and planting rack as set forth in claim 16 where said means for joining includes;
    apertured webs attached to the aforesaid frame configured to receive bolts therethrough; and
    corner pads attached to the aforesaid frame configured to provide bearing surfaces for encircling bands.

* * * * *